United States Patent [19]
Chirco et al.

[11] 3,792,645
[45] Feb. 19, 1974

[54] DOUBLE ACTION TOOL CONSTRUCTION

[75] Inventors: Peter R. Chirco, Utica; George J. Van Hecke, Fenton, both of Mich.

[73] Assignee: Huck Manufacturing Company, Detroit, Mich.

[22] Filed: Nov. 22, 1972

[21] Appl. No.: 308,690

[52] U.S. Cl............................ 91/412, 91/356
[51] Int. Cl............................ F15b 11/20
[58] Field of Search.................. 91/412, 356

[56] References Cited
UNITED STATES PATENTS

| | | |
|---|---|---|
| 2,396,001 | 5/1946 | Fischer ........................ 91/412 X |
| 2,701,551 | 2/1955 | Gunning et al. ............. 91/412 X |
| 2,820,566 | 1/1958 | Van Hecke .................. 91/412 |

*Primary Examiner*—Edgar W. Geoghegan
*Attorney, Agent, or Firm*—Harness, Dickey & Pierce

[57] ABSTRACT

A new double action tool for use in installation of fasteners and having a new shift valve means construction.

8 Claims, 5 Drawing Figures

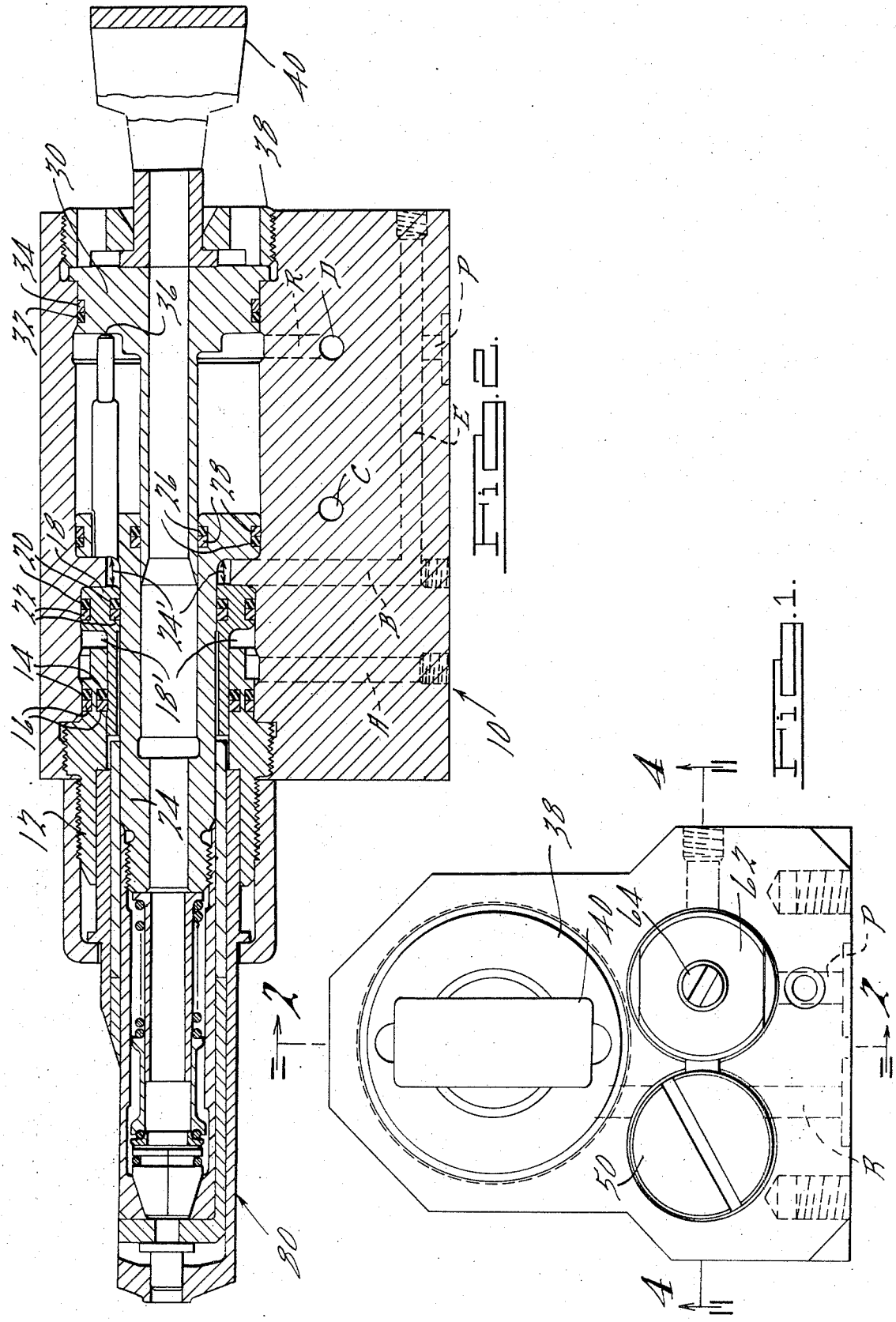

DOUBLE ACTION TOOL CONSTRUCTION

BACKGROUND OF THE INVENTION

This invention broadly relates to a new fastener installation tool. More specifically the invention relates to a new double action tool construction suitable for use in installing blind fasteners such as shown in Orloff U. S. Pat. No. 3,253,495. The state of the art is indicated by Orloff U.S. Pat. No. 3,253,495, Van Hecke U.S. Pat. No. 2,820,566, and Huck Manufacturing Company Model 200 and Model 350 Installation Tools.

An object of the present invention is to overcome disadvantages in prior fluid actuated fastener installation tools of the indicated type.

Another object of the present invention is to provide an improved fastener installation tool.

Another object of the present invention is to provide an improved fluid actuated fastener installation tool which utilizes a new shift valve means.

Another object of the present invention is to provide a new fastener installation tool of double action construction wherein the range of the tool is extended.

Another object of the invention is to provide an improved fastener installation tool that is economical to manufacture and assemble, durable, efficient, and reliable in operation.

Other objects, features and advantages of the present invention will become apparent from the subsequent description and the appended claims taken in conjunction with the accompanying drawings.

BRIEF DESCRIPTION OF THE DRAWINGS

FIGS. 1–4 illustrate an embodiment of the installation tool of this invention;

FIG. 2 is a cross sectional view taken along the line 2—2 in FIG. 1;

FIG. 3 is a left-end view of FIG. 2;

FIG. 4 is a cross sectional view taken along the line 4—4 in FIG. 1; and

SUMMARY OF THE INVENTION

Figure 3:
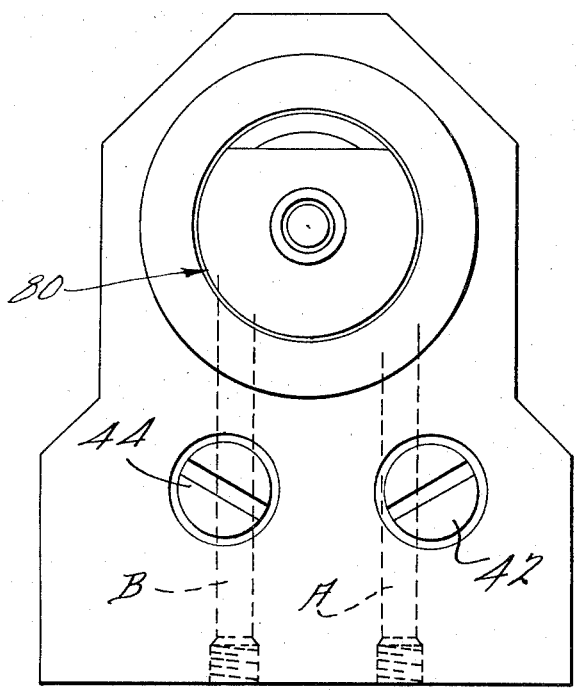

Briefly stated, the present invention concerns a double action tool for setting a fastener which includes a sleeve member, a pin member, and a lock member adapted to be engaged together, said tool being fluid actuated and comprising: a housing assembly, a pull piston, and a shift piston mounted for movement within said housing, and shift valve means within said housing for providing a highly sensitive and consistent shifting of fluid pressure from acting solely to move the pull piston in a pulling direction over to driving of said shift piston to engage said lock member after a predetermined adjustable shift pressure condition is arrived at in the setting of the fastener and before a gripping portion of the pin member is separated from the fastener, said shift valve means including a spool seating means having approximately equal pressure fluid applied to opposed portions thereof to provide said sensitive and consistent shifting.

DESCRIPTION OF PREFERRED EMBODIMENTS

Referring to the drawings, the present invention is shown incorporated in a fluid actuated fastener installation tool generally designated 10, which is of the double acting type and which is particularly adapted for use in driving blind rivets such as shown in Orloff U.S. Pat. No. 3,253,495, although it will be understood that the present invention is applicable to other uses.

The tool 10 is comprised of a nose gland 12 associated with a pair of O-rings and backup rings designated 14 and 16 respectively, a shift piston 18 with its associated O-rings and backup rings 20 and 22, a power piston or pull piston 24 with associated O-rings 26 and backup rings 28, and a cylinder cap 30 with associated O-ring 32 and backup ring 34. The tool 10 is also provided with a relief valve 36, a locking ring 38, and a deflector 40 which acts to deflect the stem of the blind fastener (not shown) when it is pulled away from the installed fastener.

Figure 4:
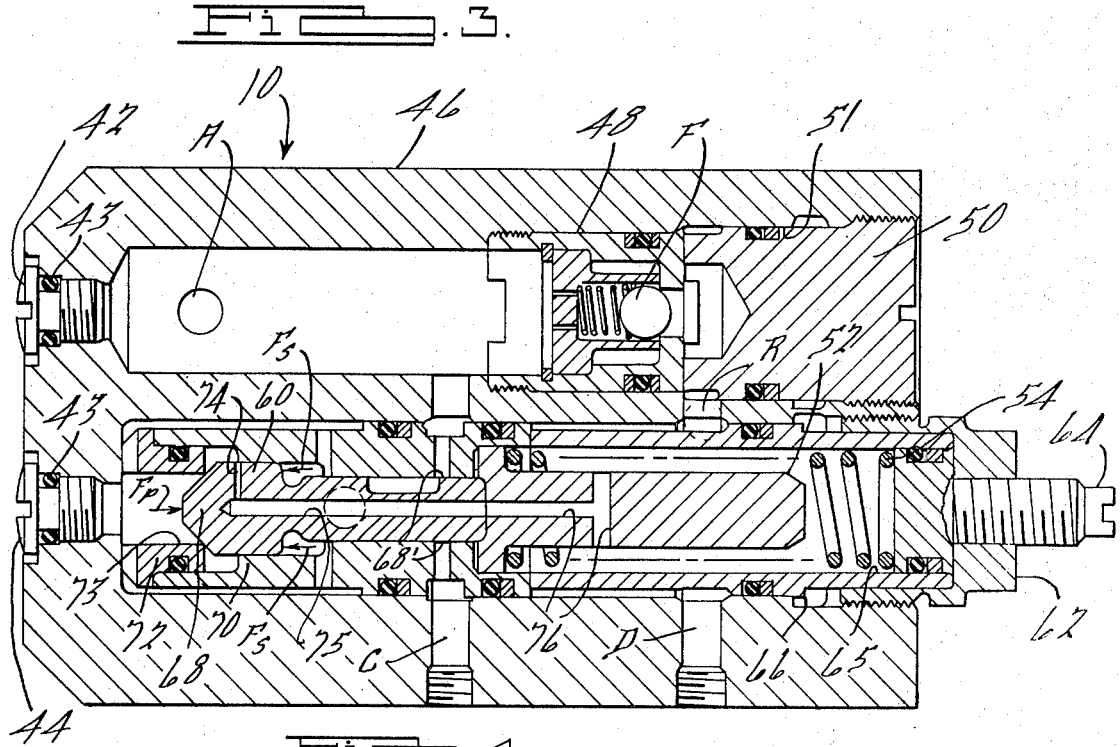

As best seen in FIG. 4 the tool 10 further comprises bleed plugs 42 and 44 and O-rings 43 associated therewith, a housing cylinder 46 into which the plugs 42, 44 are threaded, a check valve assembly 48 to be explained in more detail below, a housing screw assembly 50 which when removed provides an aperture 51 through which the check valve assembly 48 is inserted, a spring guide 52, a spring 54 (or other suitable spring means such as a Belville washer or the like) associated with the spring guide and with the spring 54 normally biasing the shift valve designated 60 to the left in FIG. 4. The shift valve cap 62 provides an aperture through which the shift valve assembly 60 can be inserted into its position within the housing cylinder 46. Adjusting screw 64 is in threaded relationship with the shift valve cap 62 for the purpose of adjusting the biasing force of the spring 54 and the adjusting screw 64 rides within the bore 65 located in the adjusting screw housing 66.

The shift valve 60 includes associated therewith a spool 68, a sleeve 70 within which the spool rides back and forth and a seat 72 against which the spool 68 is positioned when the shift valve is closed. A small bleed-off conduit means 74, 75, 76 is formed through the spool 68 and spring guide member 52 for a purpose explained more fully hereinbelow.

A suitable nose assembly designated 80 is connected to the front left-hand side of the tool 10 within the nose gland 12 as best seen in FIG. 2. The operation of such nose assembly is known and will not be further described herein.

The operation of the tool 10 in accordance with the invention is as follows.

First for the pull cycle of the tool 10, upon an operator's trigger actuation of either an electrical or pneumatic fluid source, pull pressure fluid will be directed to port P then into passage E connecting to passage B which will direct the pressurized fluid to react against the shift piston 18 and the pull piston 24 simultaneously as designated by the arrows 24'. When fluid pressure is first initiated against the pull piston as designated by the arrows 24' the rod side of the shift piston 18 cannot advance due to the fact that it is locked through valving. This is shown or verified by checking the communication of passage A to C which shows that the fluid or oil trapped at 18' on the rod side of the shift piston 18 cannot move past the ball-check valve designated F, and also, cannot relieve itself through the spool 68 and sleeve 70 valving assembly because it is blocked at the point 68' at the rearward portion of the spool member. As the oil or fluid pressure builds up as supplied through the port P, then the pressure (see FIG. 4 or FIG. 5) against the areas designated by the arrows $F_P$ and the arrow $F_S$ will be subjected to the same pressurized force and conditions of the hydraulic fluid now being supplied to the pull piston 24. At the same time the valve spool 68 is assisted in remaining closed by the shift spring 54 which provides the necessary adjustment force to cover the required range of shift pressures needed to install variations of blind fasteners, and the force applied by the shift spring 54 is adjusted through use of the adjusting screw 64. When the force against the pull piston 24 at the point designated by the arrow 24' rises to a high enough level then the pull pressure offsets the combined load of the force exerted at the arrow $F_S$ and the shift spring force acting in the direction of arrow $F_P$, thus permitting the spool 68 to shift to the right as viewed in FIGS. 4 or 5. This allows the shift piston 18 to move forward or to the left as viewed in FIG. 5 and drive the locking member of the blind fastener (not shown) at the proper moment for the blind fastener installation.

Figure 5:
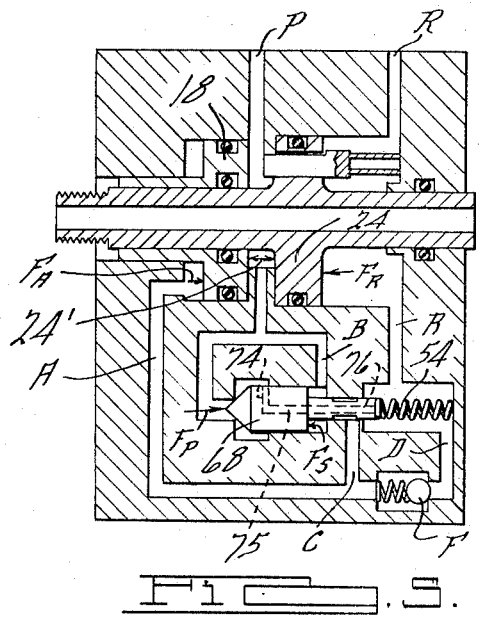
FIG. 5 illustrates the fluid circuitry used in the tool of FIGS. 1–4.

At this point the shift piston 18 will stop against the fastener lock member (not shown) and the pull piston 24 will continue to move to the right as viewed in FIGS. 2 or 5 and separate the pintail (not shown) from the installed fastener.

Upon release of the trigger by the tool operator, fluid is directed to the port R which will return the pull piston 24 to the forward position due to the fluid pressure against the backside of the pull piston 24 as indicated by the arrow designated $F_R$; and, fluid directed through the port R also repositions the shift piston 18 to its starting location because return fluid from the port R is communicated to check valve F through the port D (see FIG. 5) to thereby upset the ball of the check valve and direct fluid through port A to return the shift piston 18 to its original position by repressurizing the shift chamber at arrow $F_A$.

The advantages of the invention should be fairly apparent from the above description. However in order to specifically describe certain advantages of the invention, first, the tool of this invention is considerably more consistent in operation than prior known double action tool constructions because the inventive tool construction herein senses approximately equal pressures on both side of the novel shift valve construction utilized herein and accordingly the shift valve is highly sensitive and consistent in actuating the shift piston 18 at the appropriate time in the fastener installation cycle. Second, a much lower strength shift spring is required which spring is smaller in size and thus the overall tool weight and size is reduced. Third, with the novel shift valve construction and spring arrangement disclosed herein much finer adjustment of the shift pressure is possible and the tool is operable over an extended range as a result thereof, and for example, a different strength shift spring 54 can be interchangeably used in the tool and/or the valve seat 72 can be changed to provide a smaller orifice opening 73 to the shift valve. Other advantages will be recognized by those knowledgeable in the art.

While it will be apparent that the preferred embodiments of the invention disclosed are well calculated to fulfill the objects above stated, it will be appreciated that the invention is susceptible to modification, variation, and change without departing from the proper scope or fair meaning of the subjoined claims.

What is claimed is:

1. A double action tool for setting a fastener which includes a sleeve member, a pin member, and a lock member adapted to be engaged together, said tool being fluid actuated and comprising:
   a housing, a pull piston, and a shift piston mounted for movement within said housing, and
   shift valve means within said housing for providing a highly sensitive and consistent shifting of fluid pressure from acting solely to move the pull piston in a pulling direction over to driving of said shift piston to engage said lock member after a predetermined adjustable shift pressure condition is arrived at in the setting of the fastener and before a gripping portion of the pin member is separated from the fastener,
   said shift valve means including a spool seating means having approximately equal pressure fluid applied to opposed portions thereof to provide said sensitive and consistent shifting.

2. The tool of claim 1 wherein,
   said spool means has an adjustable spring means biasing it in one direction and operative to permit fine adjustment.

3. The tool of claim 1 wherein,
   said spool means contains bleed-off conduit means extending through a central portion thereof.

4. The tool of claim 1 wherein,
   a check valve means is included to initially resist movement of the shift piston and then to permit fluid pressure to return the shift piston to its starting position.

5. A tool for setting a fastener which includes a sleeve member, a pin member, and a lock member adapted to be engaged together, said tool being fluid actuated and comprising:
   a housing, a pull piston, and a shift piston mounted for movement within said housing, and
   shift valve means within said housing for providing a highly sensitive and consistent shifting of fluid pressure from acting only to move the pull piston in a pulling direction over to driving of said shift piston to engage said lock member after a predetermined adjustable shift pressure condition is arrived at in the setting of the fastener,
   said shift valve means including a seating means having approximately equal pressure fluid applied to opposed portions thereof to provide said sensitive and consistent shifting.

6. The tool of claim 5 wherein,
   said seating means has an adjustable spring means biasing it in one direction and operative to permit fine adjustment.

7. The tool of claim 5 wherein,
   said seating means contains bleed-off conduit means extending through a central portion thereof.

8. The tool of claim 5 wherein,
   a check valve means is included to initially resist movement of the shift piston and then to permit fluid pressure to return the shift piston to its starting position.

* * * * *